No. 730,837. PATENTED JUNE 9, 1903.
N. T. NICHOLS.
ROLLER HARROW.
APPLICATION FILED JAN. 13, 1902.
NO MODEL.
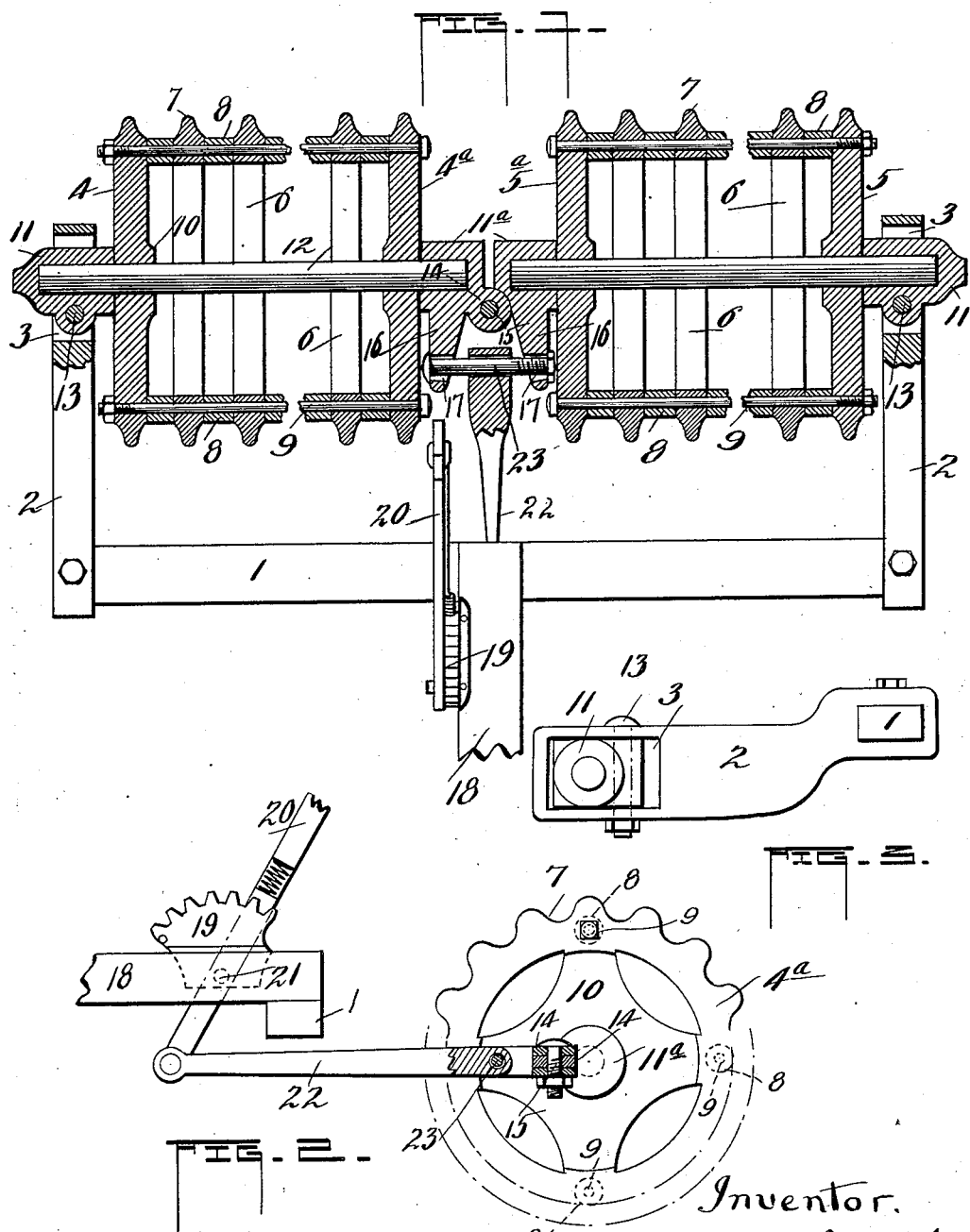

No. 730,837. Patented June 9, 1903.

UNITED STATES PATENT OFFICE.

NORMAN T. NICHOLS, OF PRAIRIE CREEK TOWNSHIP, LOGAN COUNTY, ILLINOIS.

ROLLER-HARROW.

SPECIFICATION forming part of Letters Patent No. 730,837, dated June 9, 1903.

Application filed January 13, 1902. Serial No. 89,406. (No model.)

*To all whom it may concern:*

Be it known that I, NORMAN T. NICHOLS, a citizen of the United States, residing in Prairie Creek township, in the county of Logan and State of Illinois, have invented certain new and useful Improvements in Roller-Harrows; and I do hereby declare that the following is a full, clear, and exact description of the invention, which will enable others skilled in the art to which it appertains to make and use the same.

The present invention is designed to produce a very simple but effective form of roller adapted for the crushing, pulverizing, and leveling of land.

The object of my invention is to provide a land-roller wherein a pair of pulverizers are mounted upon independent shafts whose inner ends are journaled in a hinged frame capable of lateral movement.

A further object is the provision of hinged boxings at the outer ends of the shafts of said pulverizers to permit of the movement of their inner ends.

A still further object is the provision of a series of rollers forming said pulverizers, joined by suitable spindles or rods and in the use of spacing collars or rings interposed between the matching faces of the rollers to hold them apart from each other.

These several objects are attained in the following manner and by the means hereinafter described and claimed, reference being had to the accompanying drawings, in which—

Figure 1 is a sectional plan of my improved roller. Fig. 2 is a partial elevation and sectional view of one of the rollers. Fig. 3 is an end elevation of one of the frame parts.

In the drawings I have shown a main frame-support comprising a horizontally-arranged frame-support 1 and the transverse end-connected frame parts 2, secured as shown. At the inner ends of the frames 2 I provide the rectangular openings 3 for a purpose to be further described.

4 4ª, 5 5ª, and 6 are pulverizing-rollers, those designated as 4 5 being at the extreme outside and those designated as 4ª 5ª being the inner matching rollers, and the rollers referred to as 6 being those arranged between the rollers 4 4ª 5 5ª. These rollers are substantially ring shape and combined in the manner shown form what are commonly known as "pulverizing-rollers." They are each provided with serrated or rolling peripheries, as shown at 7. To join the several rings in a series to form a roller, I provide for retaining them held apart from each other. This is accomplished by the use of spacing-collars 8 and spindles or rods 9, the latter passed through openings in the rollers 4, 5, 4ª, and 5ª and intermediate rings 6. Between adjoining faces of each ring and rings and rollers is employed a separate series of the spacing-collars 8 surrounding each rod used for retaining the parts together. This arrangement of spacing-collars leaves openings between the rings 6, with the exception of the small spaces where the collars 8 are placed, and permits all dirt and weeds to fall between them and aids in keeping the rings free of dirt and weeds. It has a further tendency of breaking clods of dirt which must fall between the open faces of the rings to the ground. By serrating or notching the peripheries, as shown, it aids materially in breaking up the ground on which the roller is worked.

The rollers 4 5 4ª 5ª are each provided with web portions 10, and 11 11ª are suitable bearings or boxings in which are journaled shafts 12, upon which the rollers rotate and to which they are attached by the same passing through the web portions 11 and 11ª, as shown.

The bearings or boxings 11, in which the outer ends of the shafts 12 are carried, have a swinging relation with the frames 2. The boxings are carried in the openings 3 of the frame 2 in the manner shown in Figs. 1 and 3 and have swelled portions, through which pass pins 13, securing the same to the frames in a pivotal manner, the openings 3 being of sufficient size to permit of movement of said boxings.

The boxings 11ª, in which the inner ends of the shafts 12 are journaled, are of peculiar construction and are connected with each other and to auxiliary means in a manner to permit of a swinging or lateral movement being imparted to the inner ends of the pulverizing-wheels. The boxings have the ear portions 14, having a swinging connection at 15, and are further provided with extensions 16, having slotted portions at 17.

18 is a tongue or pole supported from the frame 1, and 19 is a segmental rack which is secured to the tongue in a suitable manner.

20 is a lever-carrying means for engaging with the segmental rack 19 and is pivoted at 21, and the outer end of said lever has pivotal connection with a supporting bar or lever 22. This lever extends back, and at its inner end by means of a bolt or pin 23 has connection with the extensions 16 through the slotted portions 17.

In operation the pulverizer may be retained in the position illustrated in the figures, rolling parallel with the frame parts in which they are journaled, or have their inner ends shifted laterally to travel in angles oppositely to each other. This is accomplished by throwing the lever 20 forwardly, shifting the lever 22 rearwardly, which will cause the boxings $11^a$ to swing upon their pivot 15, the boxings 11 at the outer ends of the shaft hinged in the frame in such a manner as to permit of such lateral movement of the pulverizers at their inner ends. The extensions 16 have bevel matching faces which will permit of their being brought close together.

The rollers 6 4 5 $4^a$ $5^a$ may be assembled very quickly in the manner illustrated and the pulverizers shortened or lengthened, as may be desired.

Having thus fully described my invention, what I claim, and desire to secure by Letters Patent of the United States, is—

1. A combined roller and harrow, comprising a shaft, oppositely-placed wheels rotating on said shaft, a series of rings carried between said wheels, rods for supporting the rings, the rods having connection with the wheels, and a series of spacing-collars surrounding said rods between the rings, substantially as and for the purpose set forth.

2. A combined roller and harrow, comprising a shaft, wheels rotating on said shaft having circumferentially-serrated peripheries, a series of independent rings having circumferentially-serrated peripheries, a series of rods passing through the outer bodies of the wheels and rings for securing the rings for rotation with the wheels, and spacing-collars for holding the rings apart from each other carried by said rods, all substantially in the manner shown and for the purpose described.

3. In a combined roller and harrow, the combination with a main frame, two independent shafts having their outer ends journaled in swingably-arranged boxings and their inner ends journaled in sections of a boxing having a common pivotal center, wheels carried upon opposite ends of each shaft to rotate thereon, a series of rings interposed between each pair of wheels and secured for rotation therewith by means of a series of rods as shown, a separate series of spacing-collars surrounding each rod between adjacent faces of the rings, substantially as described.

In testimony whereof I affix my signature in presence of two witnesses.

NORMAN T. NICHOLS.

Witnesses:
J. A. JONES,
CHAS. W. LA PORTE.